C. CALLAHAN.
Method of Repairing Rubber-Lined Hose.

No. 197,245. Patented Nov. 20, 1877.

WITNESSES:
C. Clarence Poole
Jev. H. Evans

INVENTOR:
Cornelius Callahan
per attys.
A. H. Evans & Co.

UNITED STATES PATENT OFFICE.

CORNELIUS CALLAHAN, OF CHELSEA, MASSACHUSETTS, ASSIGNOR OF TWO-THIRDS HIS RIGHT TO EDWIN E. SIBLEY, OF SAME PLACE.

IMPROVEMENT IN METHODS OF REPAIRING RUBBER-LINED HOSE.

Specification forming part of Letters Patent No. 197,245, dated November 20, 1877; application filed October 26, 1877.

*To all whom it may concern:*

Be it known that I, CORNELIUS CALLAHAN, of Chelsea, Massachusetts, have invented a new and Improved Method of Repairing and Splicing Rubber-Lined Hose, of which the following is a clear, full, and exact description, reference being made to the accompanying drawing, in which—

Figure 1:
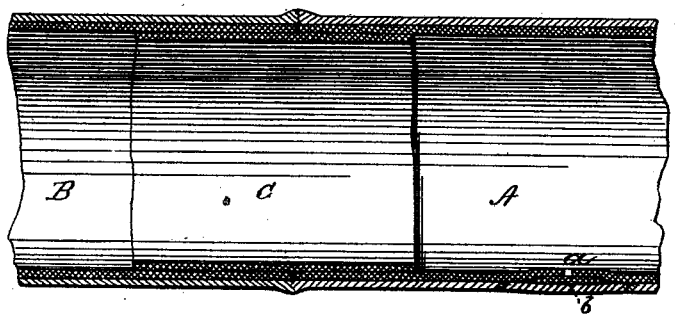
Figure 2:
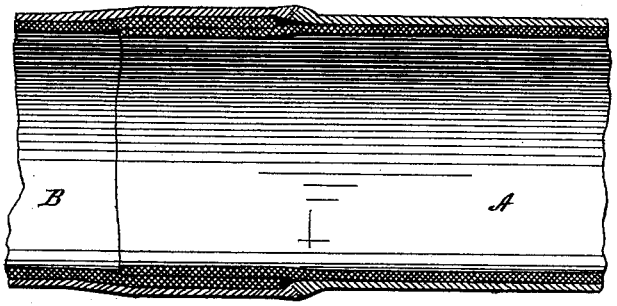
Figure 3:
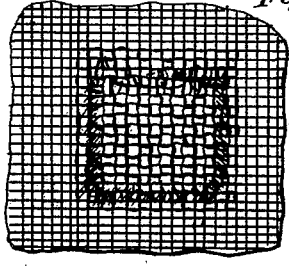

Figure 1 represents a longitudinal section of a spliced and mended hose. Fig. 2 shows the same with the rubber ends lapped. Fig. 3 shows the outer covering repaired.

My invention relates to that class of rubber-lined hose used with fire and other engines; and its object is to repair or splice the hose without waste.

The invention consists in the method hereinafter explained and claimed.

To enable others skilled in the art to make and use my invention, I will proceed to describe the exact manner in which I have carried it out.

In the drawing, A and B represent two detached parts of a hose to be joined together. From the connecting end of part A, I strip the textile covering from the rubber lining a sufficient distance—say, about two or three inches—to form a tenon, and cover the outside of the stripped portion with any adhesive cement. I then place this portion of A within the rubber lining of the piece B, bringing the ends of the covering in contact, and securing the same together by either knitted or longitudinal threads; or, if preferred, I place within the end of the piece A a portion of a section of rubber tubing, C, covered on the outside with adhesive cement, and then draw the piece B over the other part of it until the ends of the fabric are in contact, when I fasten the same, either by knitted or longitudinal threads.

When the hose is not in two pieces, but only a hole is to be repaired, I remove the fabric or covering from the inner rubber tube around the rupture sufficiently to cement upon the rupture a thin covering of rubber, $b$, and then repair the textile cover over the rubber lining thus patched or repaired, either by knitted or longitudinal threads, as shown in Fig. 3.

The only mode heretofore practiced in repairing a break or rupture in rubber-lined hose has been to insert a metallic tube into the ends, and secure the ends by wrapping with wire or otherwise, and, in case of a hole, involving cutting away the ruptured part, and thus wasting length. Patches have also been riveted on the outside.

Having thus explained my invention, what I claim as new, and desire to secure by Letters Patent, is—

The method herein described of repairing rubber-lined hose, the same consisting in bringing into contact and cementing the rubber surfaces, and then restoring the strength and fiber of the cover by knitted or longitudinal threads.

CORNELIUS CALLAHAN.

Witnesses:
 ANDREW J. HILL,
 ANNIE A. JENNINGS.